UNITED STATES PATENT OFFICE.

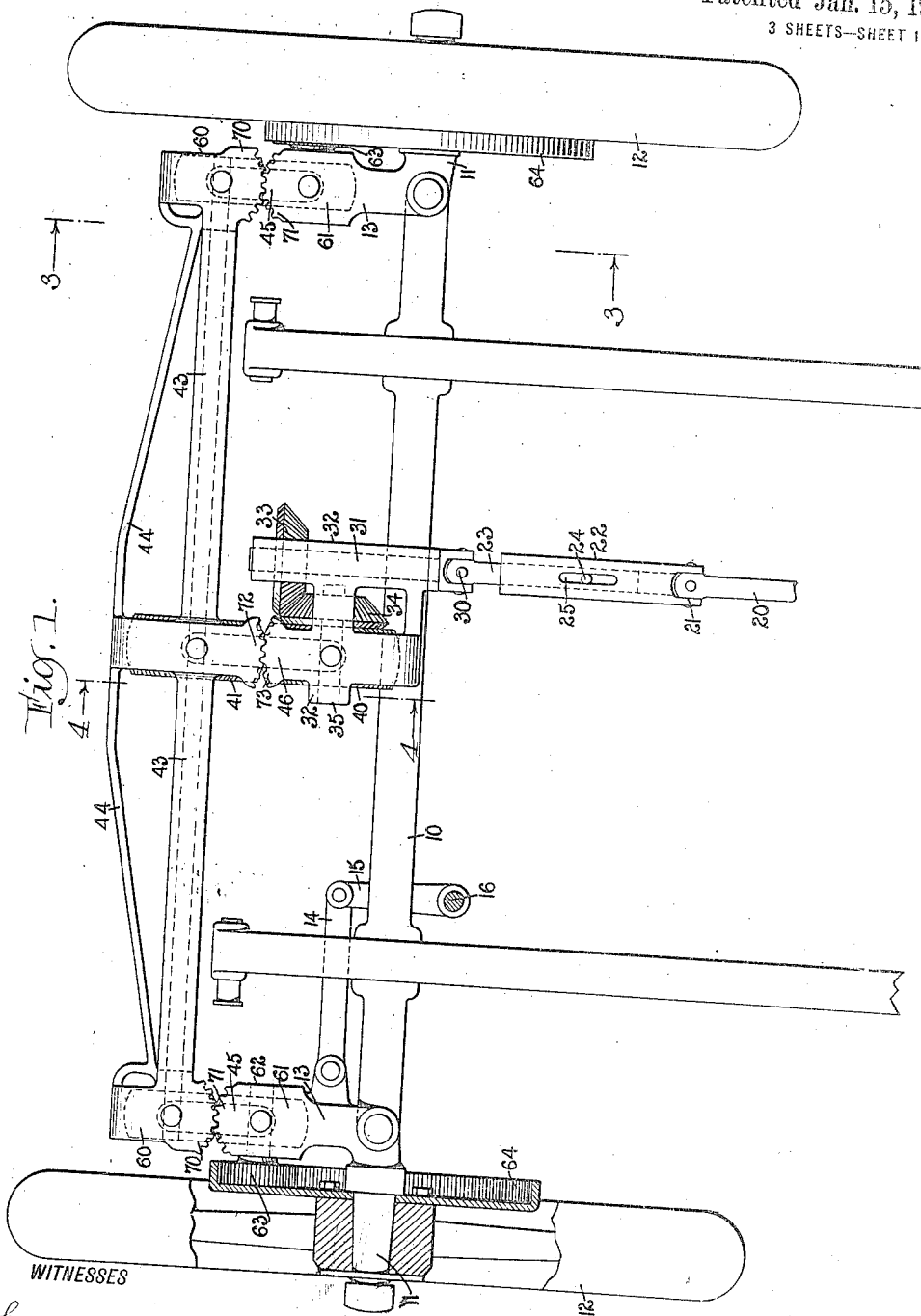

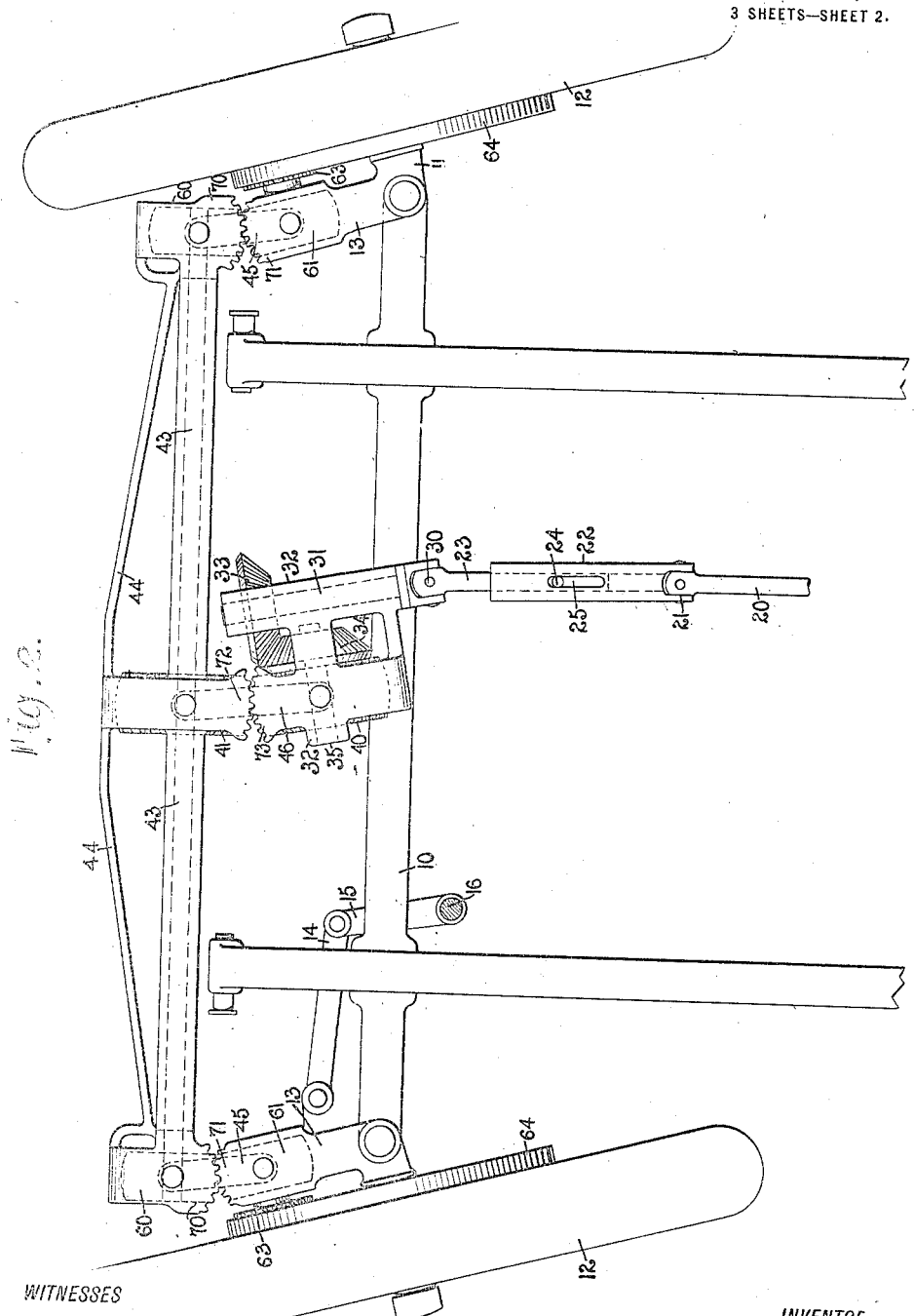

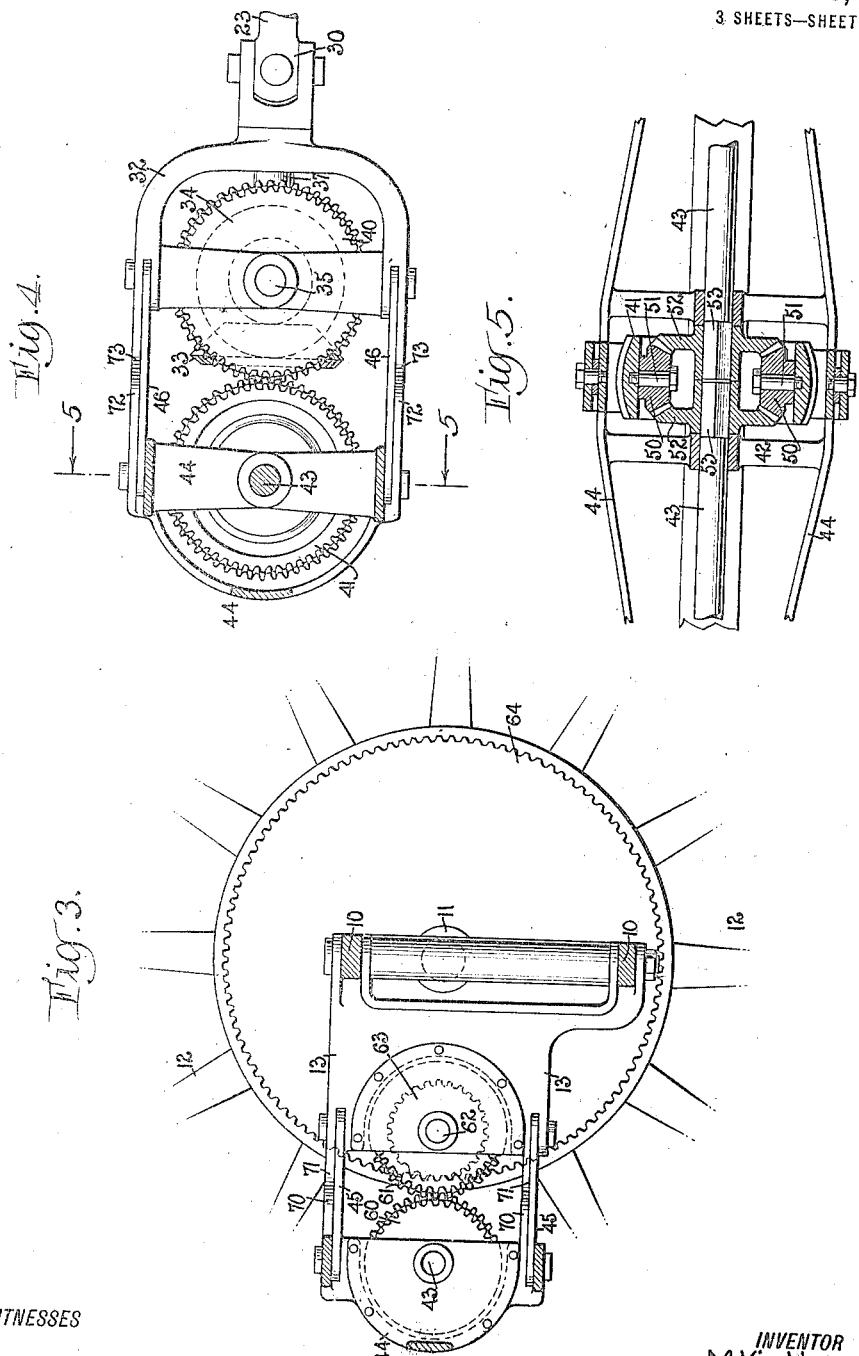

MARTIN KIMBLE, OF WAYNE, NEW JERSEY.

FRONT DRIVE FOR MOTOR-DRIVEN VEHICLES.

1,253,839.           Specification of Letters Patent.      Patented Jan. 15, 1918.

Application filed June 6, 1917. Serial No. 173,130.

*To all whom it may concern:*

Be it known that I, MARTIN KIMBLE, a citizen of the United States, and a resident of Wayne, in the county of Passaic and State of New Jersey, have invented a new and Improved Front Drive for Motor-Driven Vehicles, of which the following is a full, clear, and exact description.

The invention relates to automobiles, auto-trucks and similar motor driven vehicles, and its object is to provide a new and improved front drive for motor driven vehicles effectively to transmit the power of the motor to the front or steering wheels.

In order to accomplish the desired result, use is made of a yoke, links connecting the ends of the yoke with angular arms on the stub axles pivoted on the front axle, and a driving gear mounted partly on the said angular arms and connected with the said front wheels to drive the latter, and a motor driven gear connected at the yoke with the said driving gear.

A practical embodiment of the invention is represented in the accompanying drawings forming a part of this specification, in which similar characters of reference indicate corresponding parts in all the views.

Figure 1 is a plan view of the front drive for motor driven vehicles, parts being shown in section;

Fig. 2 is a similar view of the same with the parts in position for driving and steering the vehicle to one side;

Fig. 3 is an enlarged sectional side elevation of the same on the line 3—3 of Fig. 1;

Fig. 4 is an enlarged similar view of the same on the line 4—4 of Fig. 1; and

Fig. 5 is a cross section of the same on the line 5—5 of Fig. 4.

The front axle 10 of the motor driven vehicle is provided at its ends with pivoted stub axles 11 on which are journaled the front or steering wheels 12. The stub axles 11 are provided with forwardly extending angular arms 13, of which one is connected by a link 14 with an arm 15 projecting forwardly from a steering shaft 16 under the control of the driver for steering the vehicle either in a straight path or to one side, as hereinafter more fully explained.

The front or steering wheels 12 are driven from the shaft 20 of a motor (not shown) mounted in the usual manner on the vehicle, and the forward end of this shaft 20 is connected by universal joint 21 with a sleeve 22 in which is mounted to slide a shaft 23 provided with a pin 24 engaging a slot 25 formed in the sleeve 22 so that when the motor shaft 20 is rotated and with it the sleeve 22 then a rotary motion is given to the sleeve shaft 23. The forward end of the sleeve shaft 23 is pivotally connected by a universal joint 30 with a shaft 31 journaled in a bracket 32 and carrying a bevel gear wheel 33 in mesh with a bevel gear wheel 34 having its shaft 35 journaled in the bracket 32. With the bevel gear wheel 34 rotates a spherical gear wheel 40 attached to or formed on the back of the bevel gear wheel 34 and the spherical gear wheel 40 is in mesh with the spherical gear wheel 41 forming the master wheel of a compensating gearing 42 for driving two transverse shafts 43 journaled in a yoke 44 supported at its end by links 45 from the angular arms 13 of the stub axles 11. The middle of the yoke 44 is connected by links 46 with the bracket 32 to support the latter from the yoke.

The compensating gear 42 is provided with bevel gear wheels 50 and disposed diametrically opposite each other and journaled on studs 51 attached to the master wheel 41, as plainly indicated in Fig. 5. The pinions 50 are in mesh at opposite sides with bevel gear wheels 52 secured on the adjacent ends 53 of the yoke shafts 43 previously mentioned. It is understood that when the master gear wheel 41 is rotated from the motor shaft 20 by the gearing above described then its rotary motion is transmitted by the pinions 50 to the gear wheels 52 which in turn rotate the yoke shafts 43. On the outer ends of the yoke shafts 43 are secured spherical gear wheels 60 in mesh with similar gear wheels 61 having their shafts 62 journaled in suitable bearings arranged on the angular arms 15 of the stub axles 11. On the shaft 62 are secured pinions 63 in mesh with internal gear wheels 64 secured concentrically to the front or steering wheels 12. When the yoke shafts 43 are rotated as above described then a rotary motion is transmitted by the pairs of spherical gear wheels 60, 61 and 63 and the internal gear wheel 64 to the front or steering wheels 12.

The ends of the yoke 44 are provided with segmental gear wheels 70 in mesh with segmental gear wheels 71 formed on the ends of the angular arms 13 of the stub axles. By reference to Figs. 1 and 2 it will be noticed that the axes of the pivots of the links 45 connecting the yoke 44 with the angular arms 13 intersect the axes of the shafts 43 and 62, and the segmental gear wheels 70 and 71 have their axes coinciding with the axes of the pivots of the links 45 so that the yoke 44 moves parallel to the main axle 10 on the operator imparting a swinging motion to the angular arms 13 on steering the vehicle to one side or the other or back again to a straight path. The yoke 44 is provided at its middle with segmental gear wheels 72 in mesh with segmental gear wheels 73 formed on the bracket 32, the centers of the gear wheels 72 and 73 coinciding with the axes of the pivots for the links 46 supporting the bracket 32 from the yoke 44.

The operation is as follows:

When the motor shaft 20 is driven then a rotary motion is transmitted by the gearing above described to the front or steering wheels 12 to propel the vehicle forward. When the steering shaft 16 is turned the front wheels 12 are swung into an angular position, as shown in Fig. 2, and in doing so the angular arms 13 impart a parallel movement to the yoke 44 relative to the axle 10, and as the gear wheels 40, 41, 60, 61 are of spherical shape the power of the motor is properly transmitted irrespective of any angular position the gear wheels of the pair of wheels 40, 41 and 60, 61 assume one relative to the other and without danger of any one of the parts binding, so that the transmission of power is rendered exceedingly effective.

It will also be noticed that by having the compensating gear 42 interposed between the master wheel 41 and the shafts 43 the outer wheel 12 can travel faster than the inner wheel when steering the vehicle to one side from a straight path.

It will further be noticed that by having the link connection between the yoke 44 and the bracket 32 in the manner above described and shown in the drawings, and by allowing the shaft 23 to slide the sleeve 22, the power of the motor shaft 20 to the master wheel 41 is properly transmitted without danger of binding, and while the yoke 44 moves parallel with the front axle 10 during the traveling of the vehicle from a straight path to one side or back again into a straight path.

The front drive shown and described is comparatively simple and durable in construction, and an effective transmission of the power from the motor to the front wheels takes place, and the operator is enabled to correctly steer the vehicle from a straight path to one side or the other or back again to a straight path wholly independent of the driving of the vehicle.

Having thus described my invention, I claim as new and desire to secure by Letters Patent:

1. In a front drive for motor driven vehicles, a front axle provided with pivoted stub axles having angular arms, front wheels journaled on the said stub axles, a steering mechanism connected with one of the said angular arms, a yoke, links connecting the ends of the yoke with the said angular arms, a driving gear mounted partly on the said yoke and partly on the said angular arms and connected with the said front wheels to drive the latter, and a motor driven gear connected at the yoke with the said driving gear.

2. In a front drive for motor driven vehicles, a front axle provided with pivoted stub axles having angular arms, front wheels journaled on the said stub axles, a steering mechanism connected with one of the said angular arms, a yoke, links connecting the ends of the yoke with the said angular arms, a driving gear mounted partly on the said yoke and partly on the said angular arms and connected with the said front wheels to drive the latter, a motor driven gear connected at the yoke with the said driving gear, and a support for the said driven gear and connected by links with the said yoke.

3. In a front drive for motor driven vehicles, a front axle provided with pivoted stub axles having angular arms, front wheels journaled on the said stub axles, a steering mechanism connected with one of the said angular arms, a yoke, links connecting the ends of the yoke with the said angular arms, yoke gear wheels fixed on the said yoke, gear wheels fixed on the angular arms and in mesh with the said yoke gear wheels, a driving gear mounted partly on the said yoke and partly on the said angular arms and connected with the said front wheels to drive the latter, and a motor driven gear connected at the yoke with the said driving gear.

4. In a front drive for motor driven vehicles, a front axle provided with pivoted stub axles having angular arms, front wheels mounted on the said stub axles and provided with internal gear wheels, a yoke, links connecting the said yoke with the said angular arms, segmental gear wheels connecting the said yoke with the said angular arms, shafts journaled in the said yoke and provided at their outer ends with spherical gear wheels, pinions in mesh with the said internal gear wheels and provided with spherical gear wheels in mesh with the said spherical gear wheels on the said shafts, driving means connected with the said shafts to rotate the latter, and a steering mechanism connected with one of the said angular arms.

5. In a front drive for motor driven vehicles, a front axle provided with pivoted stub axles having angular arms, front wheels mounted on the said stub axles and provided with internal gear wheels, a yoke, links connecting the said yoke with the said angular arms, segmental gear wheels connecting the said yoke with the said angular arms, shafts journaled in the said yoke and provided at their outer ends with spherical gear wheels, pinions in mesh with the said internal gear wheels and provided with spherical gear wheels in mesh with the said spherical gear wheels on the said shafts, a compensating gear connected with the said yoke shafts, a motor driven gear in mesh with the said compensating gear, a bracket in which the said driven gear is journaled, links connecting the said bracket with the said yoke, segmental gear wheels connecting the said bracket with the said yoke, and a steering mechanism connected with one of said angular arms.

6. In a front drive for motor driven vehicles, a front axle provided with pivoted stub axles having angular arms, front wheels mounted on the said stub axles and provided with internal gear wheels, a yoke, links connecting the said yoke with the said angular arms, segmental gear wheels connecting the said yoke with the said angular arms, shafts journaled in the said yoke and provided at their outer ends with spherical gear wheels, pinions in mesh with the said internal gear wheels and provided with spherical gear wheels in mesh with the said spherical gear wheels on the said shafts, a compensating gear connected with the said yoke shafts and provided with a spherical master gear wheel, a beveled gear wheel provided with a spherical gear wheel in mesh with the said master gear wheel, a motor driven beveled gear wheel in mesh with the said first-named beveled gear wheel, a bracket in which the said beveled gear wheels are journaled, links connecting the said bracket with the said yoke, segmental gear wheels connecting the said bracket with the said yoke, and a steering mechanism connected with one of the said angular arms.

7. In a front drive for motor driven vehicles, a front axle provided with pivoted stub axles having angular arms, front wheels journaled on the said stub axles, a steering mechanism connected with one of the said angular arms, a yoke, links connecting the ends of the yoke with the said angular arms, a driving gear mounted partly on the said yoke and partly on the said angular arms and connected with the said front wheels to drive the latter, a motor driven gear connected at the yoke with the said driving gear, the said motor driven gear including a motor shaft, a sleeve having a universal joint connection with the said motor shaft, a sleeve shaft mounted to turn with and to slide in the said shaft, and a gear wheel shaft having a universal connection with the said sleeve shaft.

MARTIN KIMBLE.